(12) United States Patent
Omelaz

(10) Patent No.: US 8,296,963 B1
(45) Date of Patent: Oct. 30, 2012

(54) BLADE GAP SETTING FOR BLADE CUTTER ASSEMBLY

(75) Inventor: Richard Decena Omelaz, Frisco, TX (US)

(73) Assignee: Frito-Lay North America, Inc., Plano, TX (US)

(\*) Notice: Subject to any disclaimer, the term of this patent is extended or adjusted under 35 U.S.C. 154(b) by 0 days.

(21) Appl. No.: 13/457,109

(22) Filed: Apr. 26, 2012

Related U.S. Application Data

(63) Continuation-in-part of application No. 13/097,278, filed on Apr. 29, 2011.

(51) Int. Cl.
*B23Q 17/22* (2006.01)
(52) U.S. Cl. .......................................... 33/641
(58) Field of Classification Search ............ 33/641
See application file for complete search history.

(56) References Cited

U.S. PATENT DOCUMENTS 1,946,193 A \* 2/1934 Curdie ........................... 82/173
5,010,805 A \* 4/1991 Ferrara ........................... 99/353

OTHER PUBLICATIONS

Figure 1 schematically illustrates a known blade gap setting device. Available in commerce for many years from Urschel Laboratories Inc. of Valparaiso, Indiana, and Figure 2 a side view showing the known blade gap setting device of Figure 1 when used to measure a blade gap of a potato chip cutter head.

\* cited by examiner

*Primary Examiner* — Yaritza Guadalupe-McCall
(74) *Attorney, Agent, or Firm* — Colin P. Cahoon; Celina M. Orr; Carstens & Cahoon, LLP

(57) ABSTRACT

A blade gap setting device for attachment to a blade holder of a blade cutter assembly has an elongate body with an upper surface and a lower surface and at least one mounting for a depth micrometer having a displaceable spindle. The depth micrometer is installed through a channel of the mounting, with a free end of the displaceable spindle being exposed beneath the mounting. The device also has a first rounded front reference surface located at a position in front of the mounting, a second front reference surface extending downwardly from the body, and a third lower reference surface below the mounting or spindle. The reference surfaces serve as contact points to bear against interior portions of the blade cutter assembly; in particular, the blade holder and a top surface of the blade.

26 Claims, 11 Drawing Sheets

BLADE GAP SETTING FOR BLADE CUTTER ASSEMBLY

CROSS-REFERENCE TO RELATED APPLICATION

This is a continuation-in-part and claims filing priority rights with respect to currently pending U.S. patent application of application Ser. No. 13/097,278, filed Apr. 29, 2011. The technical disclosures of all of the above-mentioned applications are hereby incorporated herein by reference.

BACKGROUND

The present invention relates to a blade gap setting device for a potato chip cutting head and to a method of setting the blade gap on a potato chip cutting head.

DESCRIPTION OF THE PRIOR ART

It is well known to employ a rotary cutting apparatus for cutting potatoes into fine slices for the manufacture of potato chips. A well-known cutting apparatus, which has been used for more than 50 years, comprises an annular-shaped cutting head and a central impeller assembly coaxially mounted for rotation within the cutting head to deliver food products, such as potatoes, radially outwardly toward the cutting head. A series of knives is mounted annularly around the cutting head and the knife cutting edges extend substantially circumferentially but slightly radially inwardly towards the impeller assembly. The knife blade is clamped to the cutting head to provide a gap, extending in a radial direction, between the cutting edge of the blade and the head. The gap defines the thickness of the potato slices formed by the cutter. As is known in the art, the blade gap can be measured and precisely adjusted in order to control the slice thickness. The adjustment is achieved by individual adjustment screws that move the individual blades radially with respect to one another. The blade gap must be very accurately set because the accuracy of the blade gap to the desired width impacts nearly every aspect of product quality and process efficiency for the manufacture of potato chips.

FIG. 1 schematically illustrates a known blade gap setting device. Such a device has been available in commerce for many years from Urschel Laboratories Inc. of Valparaiso, Ind., USA. FIG. 2 is a side view showing the known blade gap setting device of FIG. 1 when used to measure a blade gap of a potato chip cutter head.

The known blade gap setting device 100 includes a body 102 having mounted thereon a pair of longitudinally spaced depth micrometers 104 in the form of analogue dial indicators. Each depth micrometer 104 includes a longitudinally movable measurement spindle 106 located forwardly of the body 102. The body 102 includes a lower reference surface 108 that is adapted to bear against a wall 110 of the potato chip cutter head 112. The wall 110 is known in the art as a shoe, and is spaced rearwardly of the cutting edge 114 of the elongate blade 116. A sand gate 113 is fitted to the shoe 110 and is directly rearward of the cutting edge 114. The sand gate 113 may, or may not, comprise a plurality of circumferential channels separated by circumferential ribs. The body 102 also includes a pair of longitudinally spaced side reference surfaces 118 which are adapted to bear against the blade cutting edge 114 and to rest on the upper surface 115 of the sand gate 113. These lower and side reference surfaces 108, 118 locate the device 100 both radially and circumferentially with respect to the potato chip cutter head 112.

Each depth micrometer 104 can be adjusted so as to lower the free end 120 of the spindle 106 into contact with the inner surface 122 of the blade 116 to provide a measurement of the blade gap G in a radial direction between the blade cutting edge 114 and the adjacent sand gate 113. The gap is typically from 1 to 1.5 mm.

Such a known gap setting device suffers from a number of problems.

First, the device requires reference surfaces to bear against the cutting edge of the blade, which can tend to dull the sharpness of the blade edge.

Second, the device needs to be held in place manually by the operator during the measurement process so as to locate the reference points on the cutter assembly. This leads to poor ergonomics because it is difficult for the operator to maintain the device in the require location while reading the measured blade gap and adjusting the clamping of the blade to achieve the desired blade gap. In addition, the manual holding of the device introduces health and safety issues due to the potential for inadvertent operator contact with the adjacent blade cutting edge in the series of annularly located blades when locating and holding the device in position.

Third, the combined unit incorporating the specified reference surfaces and the analogue dial indicators can provide rather inaccurate blade gap readings.

Fourth, the device can be difficult to calibrate accurately and consistently in repeated calibrations, particularly carried out by different operators.

SUMMARY

The present invention aims at least partially to overcome at least some of these problems of the known blade gap setting device.

A blade gap setting device for a potato chip cutting head comprises an elongate body having an upper surface and a lower surface, at least one mounting for a depth micrometer having a displaceable spindle, the mounting extending from the upper surface to the lower surface to permit a depth micrometer to be mounted to the upper surface with a free end of the displaceable spindle being exposed at the lower surface, a first rounded front reference surface located forwardly of the mounting, a second front reference surface extending downwardly from the body, and a third lower reference surface below the mounting.

In any embodiment of the device, the first rounded front reference surface extends longitudinally along a portion the body. In any embodiment, the first rounded front reference surface extends between two outer legs of the body.

Optionally, in any embodiment of the device, the blade gap setting device comprises two mountings, the two mountings being longitudinally spaced along the length of the elongate body, each mounting being adapted to mount a respective depth micrometer.

Optionally, in any embodiment of the device, the blade gap setting device further comprises at least one magnet connected to the body, and further optionally the at least one magnet is located towards the lower face. Further optionally, in any embodiment, the at least one magnet is supported in a holder. Further optionally, in any embodiment, the at least one magnet is sandwiched between a front block and a back block, said front block and said back block forming a block assembly. In optional embodiments comprising at least one magnet, said magnet is contained within the block assembly. Further optionally, the block assembly is attached forwardly of the mounting.

In any embodiment, the device comprises a block assembly, located forwardly of the mounting. A front bottom portion of the block assembly defines a first rounded front reference surface, which is configured to fit against an interior side of a blade holder. A bottom surface portion of the block assembly defines a third lower reference surface, which is configured to rest against a top surface of a blade. In any embodiment, optionally, the block assembly comprises an extension along its bottom length, said extension comprising the bottom surface portion that rests against a top surface of the blade.

In embodiments comprising a block assembly, the block assembly may optionally comprise a front block, wherein the front bottom portion of the block assembly extends along a bottom length of the front block. In embodiments comprising a block assembly, the block assembly may optionally comprise a back block, wherein the back block comprises said extension.

Optionally, in any embodiment, the blade gap setting device further comprises a pair of curved legs extending downwardly from the body and being longitudinally spaced along the elongate body, a front portion of the legs defining a second front reference surface. Optionally, each of the legs is located on exterior sides of at least one mounting. Optionally, the two legs have different thickness. Optionally, the two legs both comprise the same reduced thickness.

Optionally, in any embodiment of the present invention the blade gap setting device further comprises a handle extending upwardly and rearwardly from the body. Optionally, the handle is centrally located along the longitudinal direction of the elongate body.

Optionally, in any embodiment of the present invention the blade gap setting device further comprises at least one depth micrometer having a displaceable spindle, each depth micrometer being fitted into a respective mounting. Optionally, the depth micrometer is removably fitted into the respective mounting, and the device further comprises a clamping unit removably clamping each depth micrometer in the mounting, the clamping unit being adapted to permit selective rotation of the depth micrometer in the mounting.

Optionally, the blade gap setting device is in combination with a calibration block for the device, the calibration block comprising an upper surface of magnetic material adapted to hold the device thereon by a magnetic force from the at least one magnet, the upper surface having at least one tab adapted to receive the second reference surface.

A method of measuring a blade gap setting of a potato chip cutting head is further provided herein. The method comprises the steps of: providing a blade cutter assembly of a potato chip cutting head including a first shoe comprising a blade holder which removably and adjustably mounts a blade element having an exposed cutting edge and a second adjacent shoe spaced from the exposed cutting edge, a blade gap being defined between the cutting edge and the adjacent shoe; providing a blade gap setting device including a body mounting at least one depth micrometer thereon, the depth micrometer including a movable spindle, the body having a first rounded front reference surface, a second front reference surface, and a third lower reference surface; fitting the blade gap setting device to the blade cutter assembly by respectively locating the first and second front reference surfaces to inner and side surfaces of the blade holder and locating the third lower reference surface to a top surface of said exposed cutting edge; and moving a free end of the spindle into contact with the second wall element to provide a distance measurement on the respective depth micrometer.

Optionally, the body includes a magnet and the blade gap setting device is magnetically secured to the blade cutter assembly in fitting step.

Optionally, the blade gap setting device further comprises a pair of curved legs extending downwardly from the body, and the fitting step comprises sliding the legs through a spacing between the first and second wall elements.

Optionally, the fitting step comprises rotating the blade gap setting device into position by rotating a surface of the body against an internal surface of the blade holder acting as a fulcrum.

A method of calibrating a blade gap setting device of a potato chip cutting head is also provided. The method comprises the steps of: providing a blade gap setting device including a body mounting at least one depth micrometer thereon, the depth micrometer including a movable spindle, the body having a rounded first front reference surface, a second front reference surface, and a third lower reference surface, the device further optionally including at least one magnet; providing a calibration block comprising an upper surface of magnetic material adapted to hold the device thereon by a magnetic force from the at least one magnet, the calibration block having at least one tab and a slightly inclined zone in the upper surface; fitting the blade gap setting device to the upper surface of the calibration block by respectively locating the first and second front reference surfaces to the inclined zone and the tab and by locating the third lower reference surface to the top portion of said inclined zone, wherein in the device is held in the fitted position by the magnetic force from the magnet; and moving a free end of the spindle into contact with a channel in the upper surface of the calibration to provide a distance measurement on the depth micrometer.

These and other aspects and advantages of the blade gap setting device are provided, as will be apparent from the following description in conjunction with the accompanying drawings.

BRIEF DESCRIPTION OF THE DRAWINGS

Embodiments of the present invention will now be described, by way of example only, with reference to the accompanying drawings, in which.

DETAILED DESCRIPTION

Figure 3:
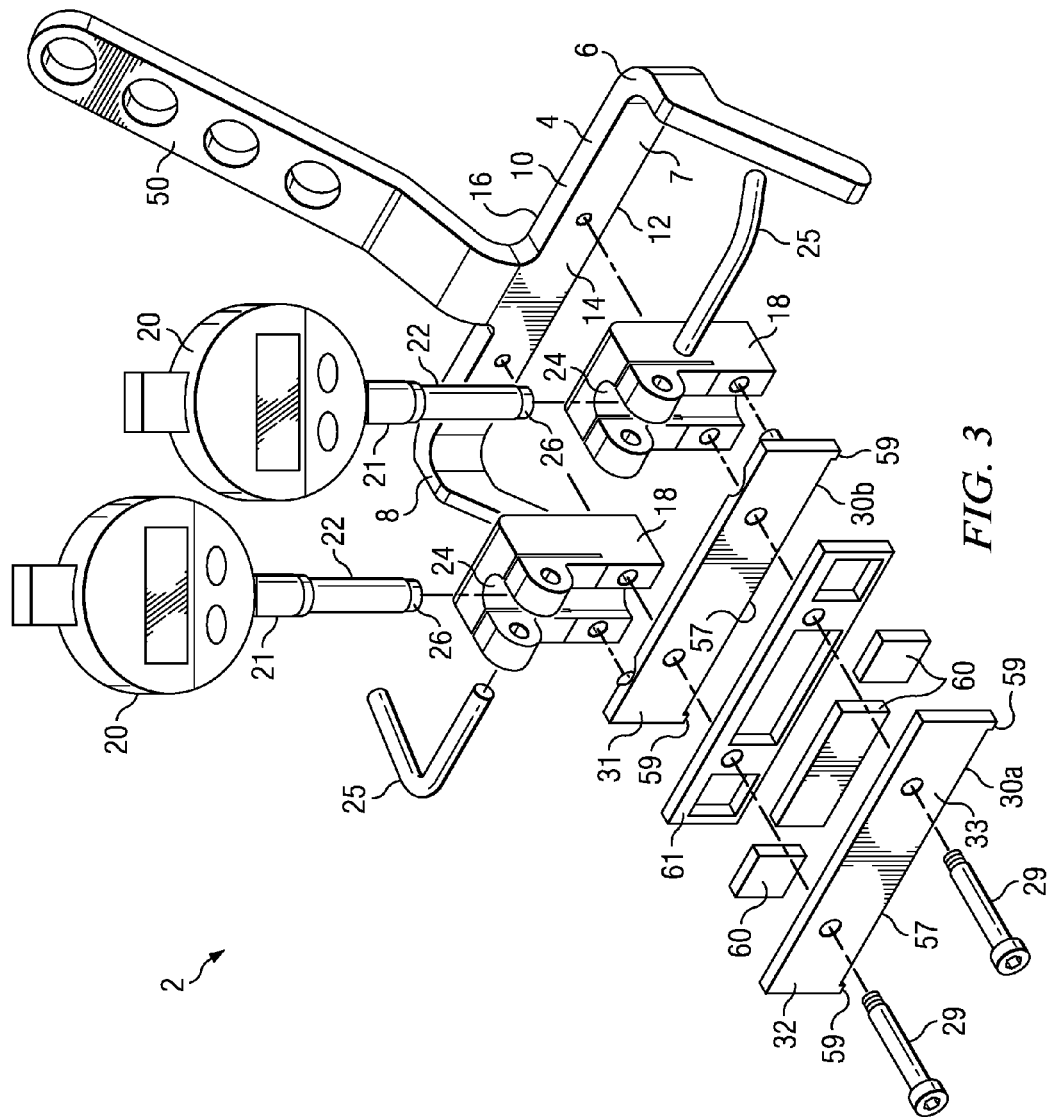
FIG. 3 is an exploded perspective view of a blade gap setting device in accordance with an embodiment of the present invention.
Figure 4:
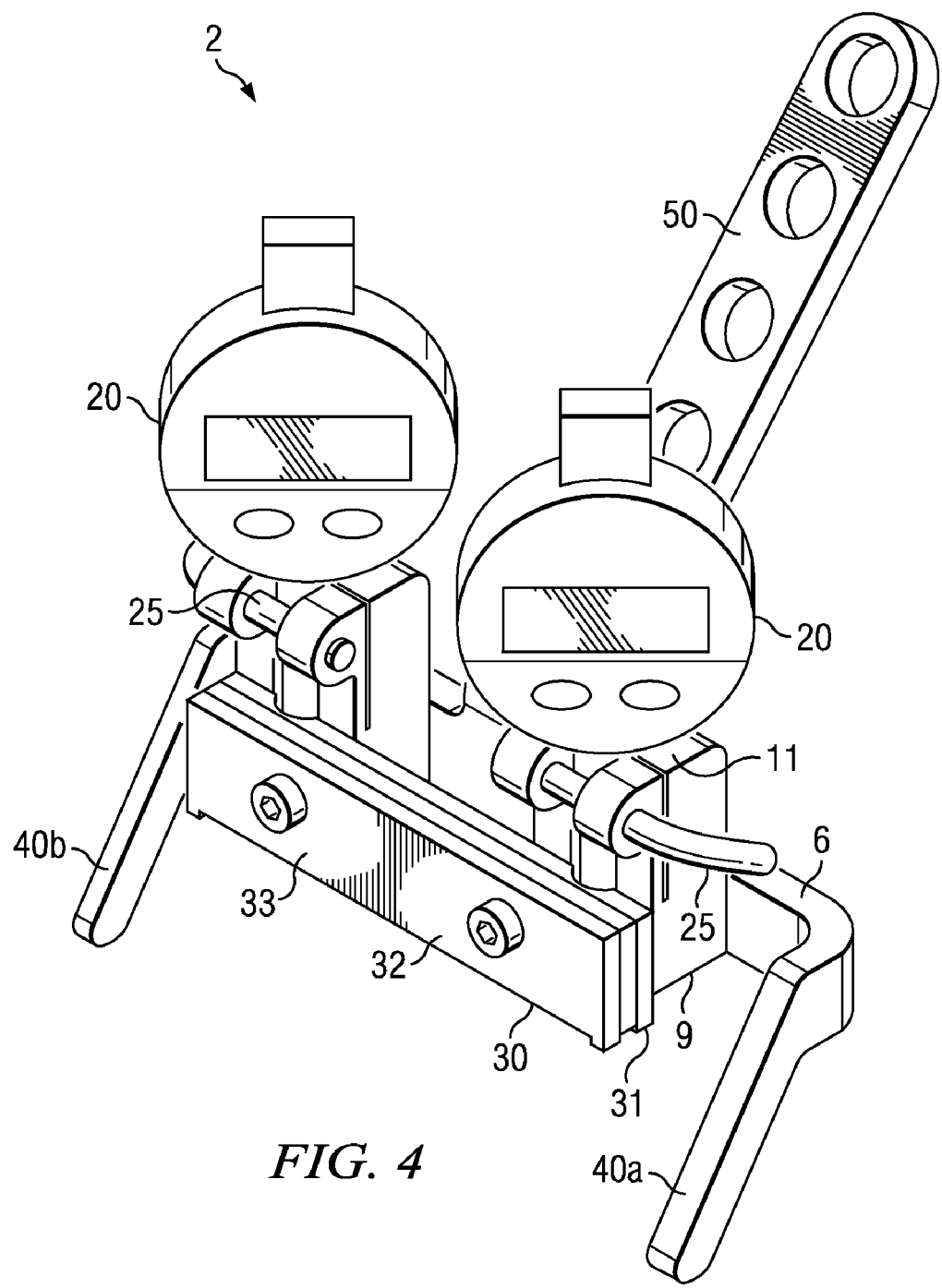
FIG. 4 is a perspective view of the assembled blade gap setting device of FIG. 3.

Referring to FIGS. 3 to 5, a blade gap setting device, designated generally as 2, in accordance with an embodiment of the present invention is illustrated. The device 2 includes a longitudinally extending elongate body 4 which is rigid. The body 4 is typically composed of a metal such as stainless steel. The longitudinal body 4 extends between first and second opposed ends 6, 8. The body 4 includes a support portion 7 which has an upper face 10, a lower face 12, a front side 14 and a rear side 16. Located inwardly of a respective end 6, 8 and fitted to the front side 14 are a pair of mountings 18 of the body 4, each mounting 18 adapted to mount a respective depth micrometer 20 having a displaceable spindle 22. The mounting 18 includes a hole 24, or channel as illustrated, extending downwardly there through to permit the depth micrometer 20 to be removably inserted into the hole 24. This mounts the depth micrometer 20 to the body 4 with a free end 26 of the displaceable spindle 22 being exposed at a lower surface 9 of the device 2. The hole 24 extends through the thickness of the body 4 between an upper surface 11 and the lower surface 9. The holes 24 are longitudinally separated along the length of the elongate body 4 so that each hole 24 is located inwardly of a respective end 6, 8 of the body 4.

Each depth micrometer 20 includes an annular shaft 21 containing the movable spindle 22. The shaft 21 is clamped within the hole 24 using a rotatable clamping element 25, which may include a cantilevered flexure providing an interference fit to provide sufficient friction to hold the depth micrometer 20 in the respective hole 24. The clamp can be released to allow the angular position of the depth micrometer 20 to be rotated to a desired rotational position.

The depth micrometer 20 is preferably a commercially available depth micrometer with a digital display readout providing an absolute measurement of the distance of the blade gap.

In a modified embodiment, the body 4 is provided with only one mounting 18 for a single depth micrometer 20. In a yet further modified embodiment, the body 4 is provided with greater than two mountings 18 for mounting greater than two depth micrometers 20.

A pair of lower reference surfaces 30a, 30b are provided on the lower surface 9, the two lower reference surfaces 30a, 30b being laterally spaced across the width of the elongate body 4. The lower reference surfaces 30a, b are fixed by bolts 29 to, and located forwardly of, the pair of mountings 18. The reference surfaces 30a, b extend longitudinally between and beyond the two mountings 18. The lower reference surfaces 30a, b are located downwardly from the body 4. The reference surfaces 30a, b may be integral with the body 4 or alternatively, as illustrated, defined in respective parallel longitudinal blocks 31, 32 fitted to the body 4.

A front reference surface 33 is located forwardly of the mountings 18. The front reference surface 33 is comprised of the front surface of block 32. The front reference surface 33 is employed to fit against a side surface of the sand gate, or of a shoe holding the sand gate, in order to fit the device in a desired circumferential position to a potato chip cutting head. The lower reference surfaces 30a, b are employed to fit against an upper surface of the sand gate, in order to fit the device in a desired radial position to a potato chip cutting head.

Each reference surface 30a, b comprises a central higher portion 57 between two opposed lower portions 59. These different height portions 57, 59 enable the reference surfaces 30a, b to engage with different cutter heads or with different respective sand gate constructions, used for manufacturing different types of potato chip using the same cutter head incorporating different blade/sand gate combinations.

A pair of inclined legs 40a, 40b extends downwardly and forwardly of the body 4. The legs 40a, 40b are longitudinally spaced along the elongate body 4, each being located at a respective end 6, 8. One leg 40a is of different thickness than the other leg 40b. The legs 40a, 40b have different thickness in order to achieve the desired longitudinal distance between reference surface 40a and the free end 26 of the spindles 22 as well as reference surface 40b and the free end 26 of the spindles 22 in order to align the opposed free ends 26 properly on shaped blades.

A handle 50 is integral with or mounted to the body 4. The handle is inclined rearwardly and upwardly away from the body 4, and therefore the legs 40 and handle 50 extend towards opposite sides of the body 4. The handle 50 is centrally located along the longitudinal direction of the elongate body 4.

At least one magnet 60 is connected to the body 4, and may be provided in or on the body 4. In the illustrated embodiment, the three linearly spaced magnets 60, extending serially along the length of the body 4, are held in a holder 61 which is sandwiched between the two blocks 31, 32. The magnets 60 are preferably located towards or at the lower surface 9 so that the lower surface 9 of the body 4 is magnetically attracted to a material such as stainless steel from which a blade cutter assembly of a potato chip cutting head is typically composed. The magnets 60 provide that the body 4 can be temporarily attached, by the magnetic force, to the internal circumferential surface of such a blade cutter assembly.

Figure 5A:
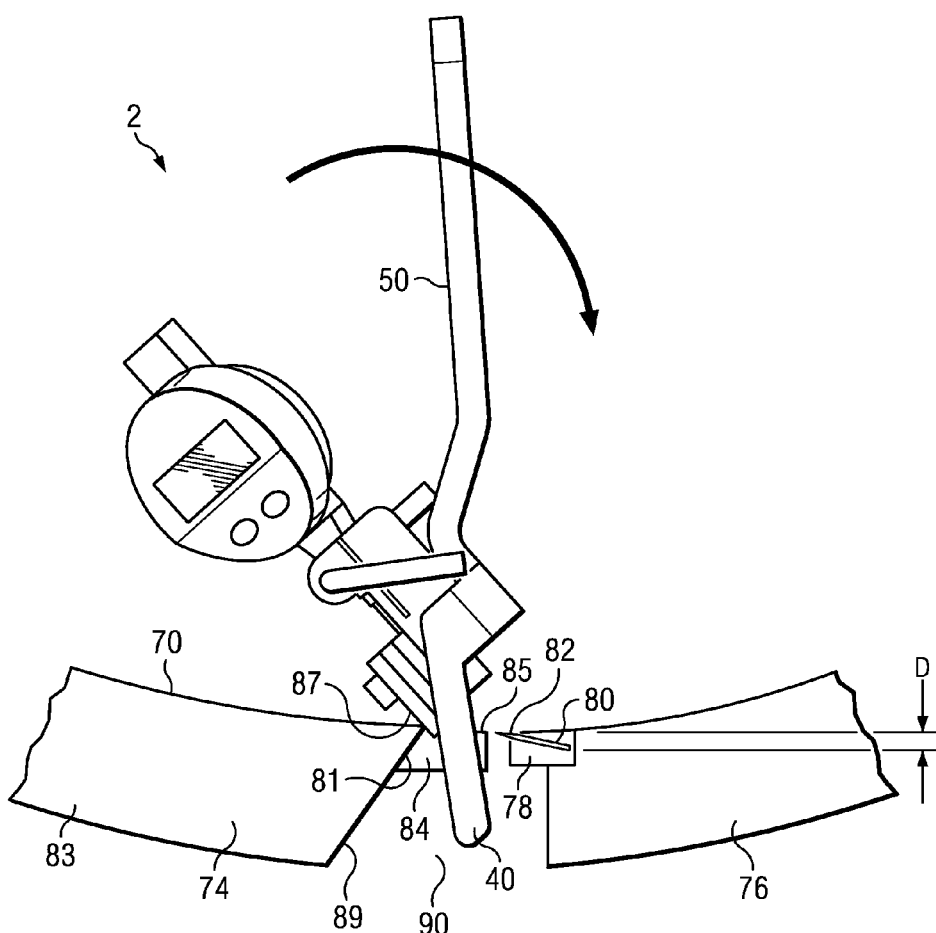
FIGS. 5A and 5B are side views that illustrate sequential steps during insertion of the blade gap setting device of FIG. 3 into a cutting head.
Figure 5B:
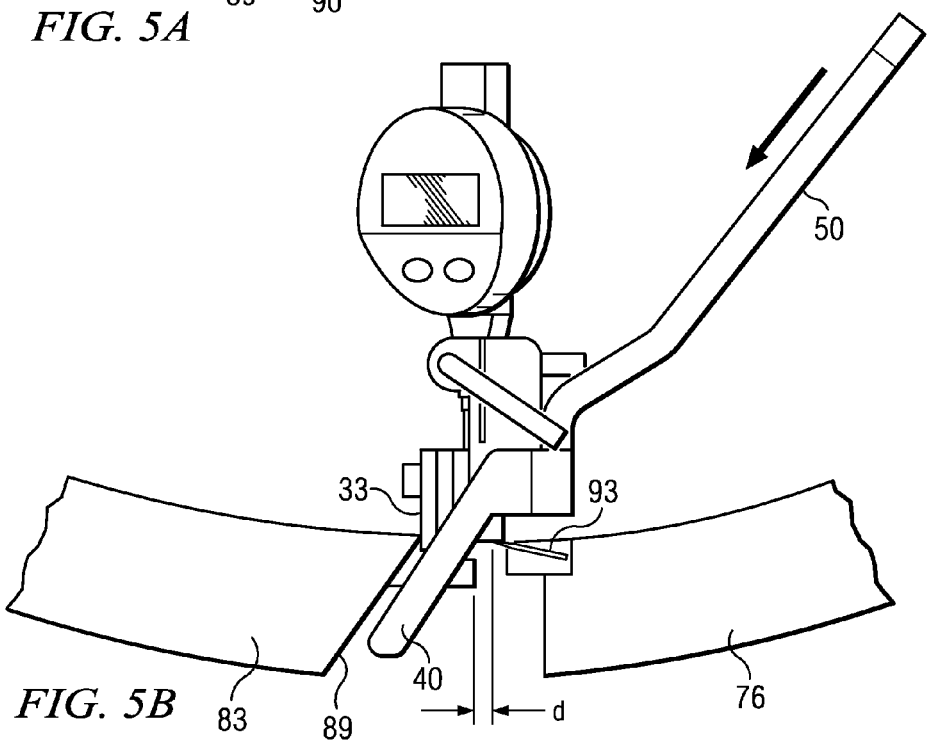

In use, as shown in FIGS. 5a and 5b, the blade gap setting device 2 is temporarily attached by the magnetic force of the magnets 60 to the internal circumferential surface 70 of a blade cutter assembly 74 of a potato chip cutting head. The blade cutter assembly 74 includes an arcuate first wall element 76, or shoe, carrying a blade mount 78 which removably and adjustably mounts an elongate blade element 80 having an exposed cutting edge 82 pointing substantially circumferentially but oriented radially inwardly, as is known in the potato chip cutter art. A sand gate 84, comprising a second wall element which may or may not have a plurality of circumferential channels separated by ribs (not shown), is spaced circumferentially from the exposed cutting edge 82 by a spacing 90 having a distance d. The sand gate 84 is supported on a second arcuate wall element 83, or shoe. The cutting edge 82 is radially inwardly located a desired blade gap distance D from the inner surface of the sand gate 84. This distance D can be varied by moving the elongate blade element 80 in the blade mount 78.

The blade gap setting device 2 is held manually by the handle 50 and moved within the central cavity of the blade cutter assembly 74 towards the internal circumferential surface 70. The legs 40a, 40b are longitudinally spaced along the elongate body 4 by a distance which is greater than the length of the blade element 80 to be measured, so that the legs 40 do not contact the blade element but slide into the spacing 90 between the wall element 76 and sand gate 84 at opposite ends of the blade element 80.

As shown in FIG. 5a, the device 2 is inserted with the legs 40 substantially downwardly and radially oriented. After insertion, the device 2 is rotated downwardly as shown by the arrow in FIG. 5a with the end wall 81 of the sand gate 84 acting as a fulcrum against which the front surface 87 of the body 4 is rotated. This action causes the operator to push the device 2, as shown by the arrow in FIG. 5b, downwardly and away from the blade element 80 so that the cutting edge 82 of the blade element 80 is not inadvertently damaged. The inclined legs 40 function to indicate the insertion orientation of the device and are shaped and dimensioned to cooperate complementarily with the shape and dimensions of the inclined end surface 89 of the shoe 83. This inclined leg configuration ensures that the operator inserts the device in the correct orientation.

The lower reference surfaces 30a, b are rotated downwardly so as to contact the inner surface 85 of the sand gate 84. This locates the device accurately in position over the blade cutter assembly 74 within the potato chip cutting head, as shown in FIG. 5b.

No part of the device has contacted the blade edge 82 during the fitting operation. The rearmost part of the first reference surface 30 is spaced a small distance, for example about 0.5 mm, forwardly from the cutting edge, so as not inadvertently to damage the cutting edge. The device 2 is held in this fitted position by the magnetic attraction between the magnet 60 and the sand gate 84.

During the subsequent measuring operation, the free ends 26 of the spindles 22 are positioned downwardly so as to rest upon the upper surface 93 of the blade element 80. The depth reading shown in the digital display of the depth micrometers 20 corresponds to the blade gap D. The depth micrometers 20 are preferably longitudinally spaced by a distance which substantially corresponds to the length of the blade element 80 to be measured, so that the free ends 26 of the spindles 22 contact the longitudinal ends of the upper surface of the blade element 80. This avoids any potential damage to the major central cutting portion of the blade element 80.

While the device is fitted in the desired location and held in a hands-free manner by the magnetic fitting, the position of the blade element 80 within the blade mount 78 can be adjusted.

Thereafter, the handle 50 can be manually engaged and pulled upwardly, disengaging the magnetic holding force. This rotates the device upwardly in a reverse direction away from the sand gate 84, with the end wall 81 of the sand gate 84 again acting as a fulcrum against which the front surface 87 of the body 4 is rotated. After the legs 40 are substantially radially oriented, the device 2 can be pulled clear. The device may then be used to measure and adjust the blade gap of the adjacent blade cutter assembly 74.

Figure 6:
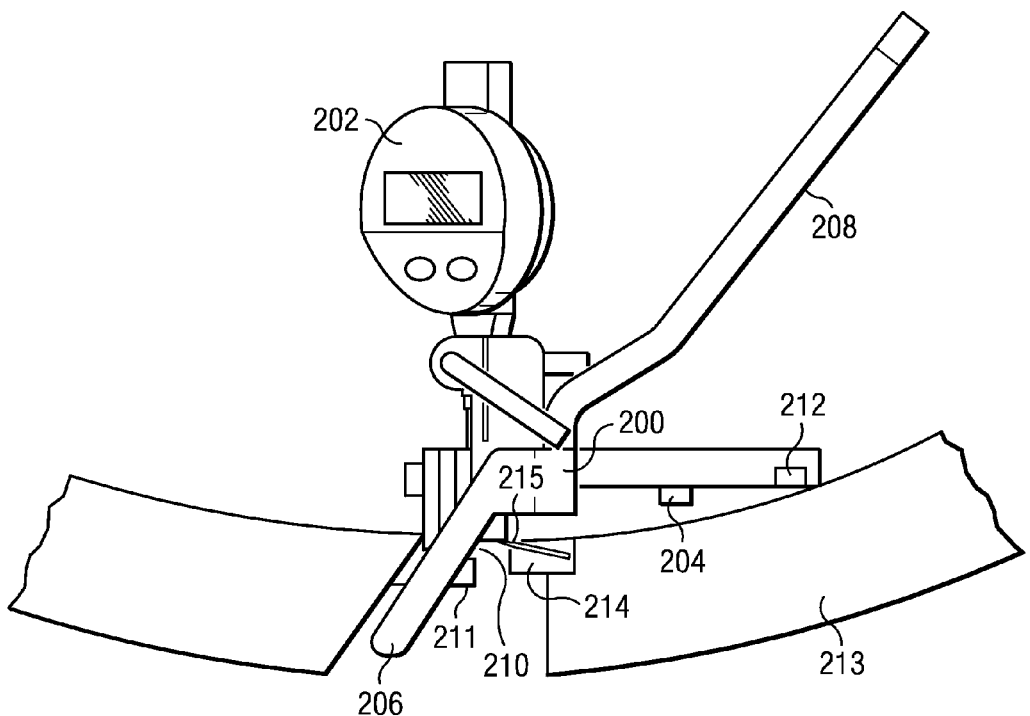
FIG. 6 is a schematic side view showing a blade gap setting device in accordance with a second embodiment of the present invention when used to measure a blade gap of a potato chip cutter head.

FIG. 6 shows an alternative construction for a blade gap setting device according to a second embodiment of the present invention. The structure is similar to that of the first embodiment, incorporating an elongate body 200 mounting depth micrometers 202, a magnet 204, inclined legs 206 and an inclined handle 208. However, in this embodiment the device includes at least one first reference surface 210 which is adapted to be disposed on the sand gate 211 after fitting for the measurement operation, similar to the reference surfaces 30 of the first embodiment, and a second reference surface 212 which is adapted to be disposed on the shoe 213 carrying the blade mount 214 after fitting for the measurement operation. The first and second reference surfaces 210, 212 are spaced apart so as to be located on opposite sides of the blade 215 after fitting for the measurement operation. The magnet 204 is mounted on the body 200 so as to be disposed above or against the shoe 213 carrying the blade mount 214 after fitting for the measurement operation. Again, the insertion operation is similar to that of the first embodiment, by rotating the device downwardly and urging the device away from the blade 215 and against the edge of the sand gate 210.

By providing that the blade gap setting device 2 may incorporate one or more magnets so as to be adapted to be magnetically held onto a magnetic material, in accordance with another aspect of the invention the device may benefit from improved calibration accuracy and repeatability.

Figure 7:
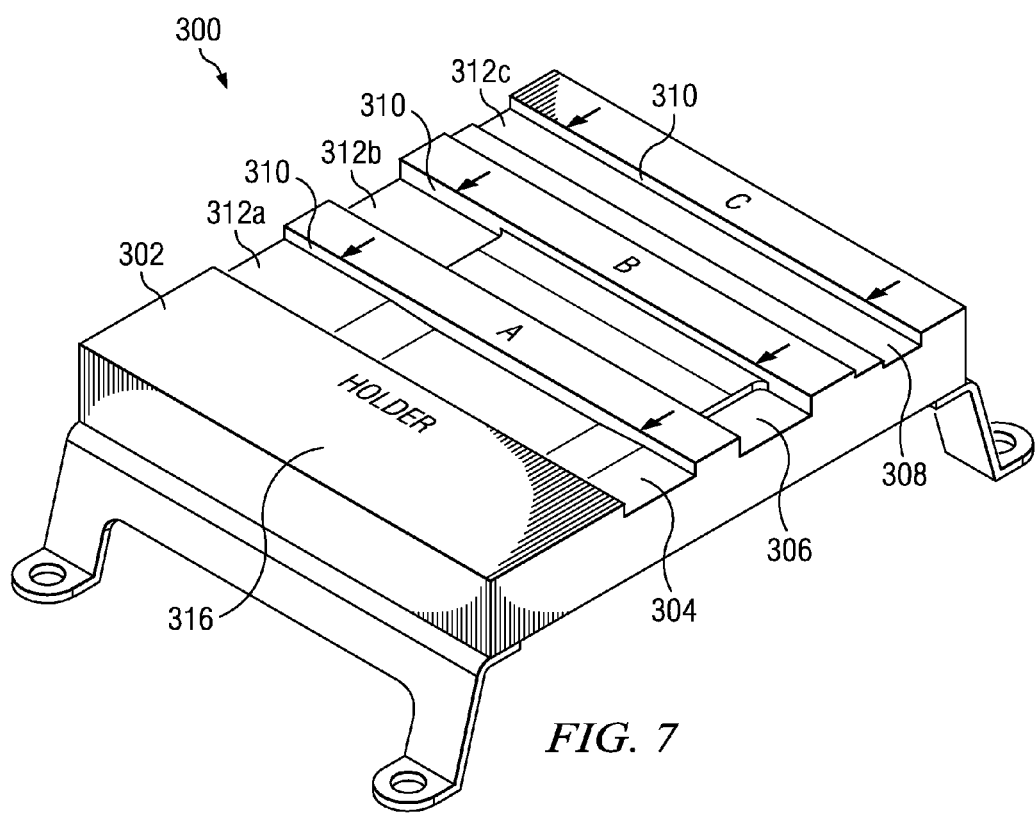
FIG. 7 is a perspective view of a calibration block for use with the blade gap setting device in accordance with another aspect of the present invention.

Referring to FIG. 7, the depth micrometer(s) 20, when mounted in the device 2, can readily be calibrated on a calibration block 300 which can also act as a holder for the device 2. The calibration block 300 may be made of a magnetic material to enable the calibration operation to be hands-free. The calibration block 300 may be composed of a hard stainless steel magnetic material, for example stainless steel 440C, which improves the dimensional stability and wear resistance of the calibration block 300.

The calibration block 300 has a generally planar upper surface 302 which includes at least one calibration channel. In the illustrated embodiment there are three parallel calibration channels 304, 306, 308. Each channel 304, 306, 308 corresponds to a cutter head set-up for manufacturing a particular potato chip product. The channels 304, 306, 308 therefore vary in channel depth and in the profile of the lower surface 312a, b, c of the channels 304, 306, 308. The upper surface 302 also has a planar holding zone 316 for resting the device 2 when not in use.

During the calibration process, the body 4 of the device 2 is fitted into the selected channel 304, 306, 308. The front reference surface 33 is urged against a reference edge 310 of the selected channel 304, 306, 308, indicated by arrows on the upper surface 302. This simulates the front reference surface 33 fitting against a side surface of the sand gate, or of a shoe holding the sand gate, in the corresponding potato chip cutting head. The lower reference surfaces 30a, b are received in the selected channel 304, 306, 308 and rest on the lower surface 312a, b, c, which simulates the device 2 resting on the sand gate. The selected channel 304, 306, 308 is therefore adapted to fit the device 2 in a desired vertical and horizontal position on the calibration block 300 simulating the corresponding position on the associated cutting head.

The spindle of the depth micrometer 20 can then be lowered into contact with the calibration block 300 and the readout adjusted to provide a zero reading. This means that when subsequently used to measure blade gap, the absolute measurement of the blade gap is indicated on the display of the depth micrometer 20.

The blade gap setting device described herein provides a number of advantages over the known blade gap setting device discussed hereinabove with regard to FIGS. 1 and 2.

In particular, the blade gap setting device can provide a very accurately measurement of the blade gap setting, typically with a tolerance of +/−40 microns. The gap setting can be accurately measured along the length of the blade.

In addition, the blade gap setting device is very easy to install accurately in position on the potato chip cutting head.

The magnet holds the device in the desired position on the potato chip cutting head, allowing the operator to use both hands to adjust the blade gap while the measuring device is still located securely in position in the potato chip cutting head. Therefore the blade gap setting device is configured as a "hands-free" device. The particular magnet design described herein allows for the use, to form the body, of hard stainless steel materials, for example stainless steel 440C, which improves the dimensional stability and wear resistance of the device.

The inclined handle improves the ergonomics of the device and provides easy maneuvering of the device into and out of the measurement position. The handle provides leverage to disengage the magnetic force holding the device onto the cutting head, with the front end of the body being rotatable against a fulcrum of the cutter head during the insertion and removal operation. The handle is oriented upwardly away from the body and points towards the rearward side of the device, which tends to move the hand of the operator upwardly away from any adjacent cutting blades of the series of cutting blades which are located annually around the potato chip cutting head.

In addition, the blade gap setting device described in FIGS. 3 to 5 does not contact the cutting edge of the blade during use and so does not tend to dull the cutting edge during use, in contrast to the known setting device discussed above in FIGS. 1 and 2. The blade gap setting device includes reference surfaces that only bear against and reference the interior circumferential wall and/or sand gate surfaces. The spindle of the depth micrometer only bears against the inner surface of the blade, which constitutes the top blade surface during the measurement operation. No part of the blade gap setting device applies a force, in particular a lateral or sideways force, onto the blade edge and therefore the blade is not dulled during the measuring operation. Furthermore, since the operator manually places the device in the opposite direction of the blade edge, the device exhibits improved health and safety benefits.

The reference surfaces described herein are configured to be utilizable with a wide variety of different cutting head shapes and dimensions. Furthermore, in some embodiments, because the reference surfaces of the blade gap setting device do not contact the blade cutting surface, the correct orientation of the blade gap setting device is independent of blade shape and configuration, and accordingly the same device can be used alternatively with linear planar blades, such as for manufacturing conventional potato chips, or non-planar profiled blades, such as for manufacturing crinkle cut or other three dimensionally-shaped potato chips.

The structure of the body of the blade gap setting device, in particular the structure of the inclined legs, provides that the device can be quickly and easily located in the correct position and orientation within the cutting head without damaging the depth micrometers or the blade. This provides that the device can readily be located in position without danger of damaging either the cutter head or the device itself.

The depth micrometers can readily be located into the correct angular position for reading the upper surface of the blade. By providing a design with the inclined legs, the device can be reliably rotated into a correct engaged position with the magnetic holding force holding the device in position.

The device described herein may be used for the blade gap measurement of cutter heads of the two ring or single ring type, with appropriate rotation of the depth micrometers so that the display is visible to the operator in the respective measurement orientation.

Other modifications to the blade gap setting device described above will be readily apparent to those skilled in the art.

Referring to FIGS. 8 to 9, another embodiment of a blade gap setting device is illustrated, which is suitable for attachment to a blade holder of a blade cutter assembly for foods such as potato chips. The gap setting device 400 includes a generally elongated body 402, which extends from an outer leg 442a to another outer leg 442b. The body 402 includes a support portion 406, which has an upper face 408, a lower face 410, a front side 412, a rear side 414 and opposing ends 404. The body further includes an upper surface 427 and a lower surface 444. A handle 416 extends upwardly and rearwardly from the body 402 and is centrally located along the longitudinal direction of the elongated body 402. As with embodiments describe above, the handle is inclined rearwardly from the body 402 as depicted in the figures. In one embodiment, the handle 416 is integral with the body 402. In another embodiment, the handle 416 is mounted to the body 402 by any means known in the art. Typically, the support portion 406 is composed of a metal such as stainless steel.

Figure 8A:
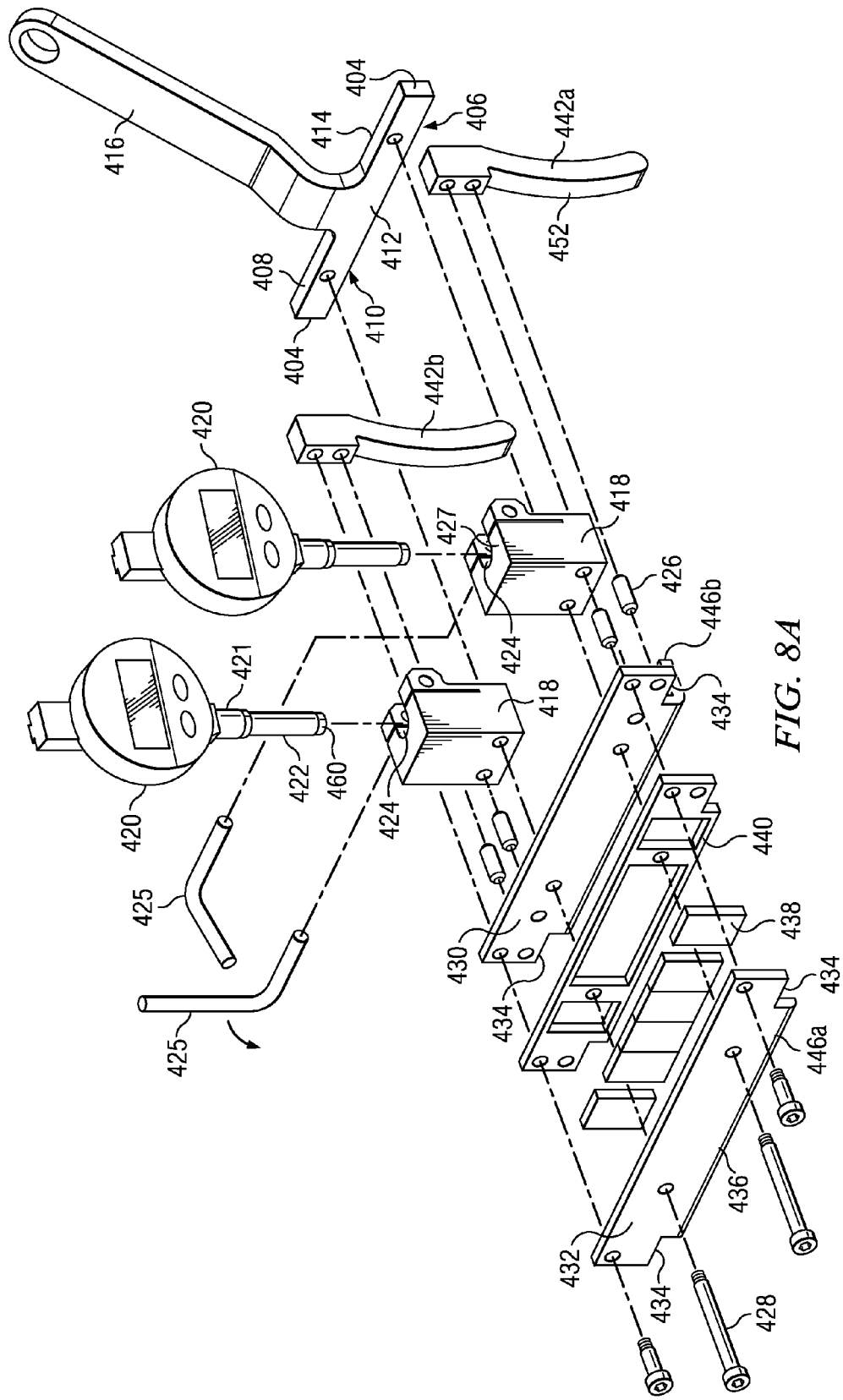
FIG. 8A is an exploded perspective view of another embodiment of a blade gap setting device.

Located inwardly of opposing ends 404 of the support portion 406 and fitted to the front side 412 is at least one mounting 418, which is adapted to mount a depth micrometer 420 having a displaceable spindle 422. As depicted in FIG. 8A, the illustrative embodiment comprises two mountings being longitudinally spaced along the length of the elongate body 402. Each mounting 418 includes a hole or channel 424 extending downwardly therethrough to permit the depth micrometer 420 to be removably inserted into the hole 424. The channel 424 extends through the mounting 418 from its upper surface to its lower surface and generally through the thickness of the mounting 418 from top to bottom. When mounted, the displaceable spindle 422 extends through the channel 424 such that a free end 460 is exposed at a lower surface 444 of the body 402. Each of the mountings 418 are longitudinally separated along the length of the elongate body 402 such that each mounting 418 and its channel 424 is located inwardly of the legs 424. In one embodiment, as depicted best in FIGS. 9A and 9B, the outer sides of the mountings 418 are aligned with the outer sides of the opposing ends 404 of the support portion 406. However, in other embodiments, the mountings 418 are located slightly inward from the opposing ends 404.

Unlike the above embodiments wherein the mounting is attached with its channel facing away from the support portion, in the embodiments depicted beginning with FIG. 8, the channel 424 faces the support portion 406 when attached thereto. Thus, as best shown in FIG. 8A, the mountings 418 are attached to the support portion 406 with locating pins 426 through the bottom end of the mountings 418. The pins 426 are further mounted to the legs 442. When attached, the channel 424 is located between the front side 412 of the support portion 406 and the opposite side of the mounting 418 and the, forming a hole therethrough for removable insertion of the micrometer 420.

Each depth micrometer 420 includes an annular shaft 421 containing the displaceable or movable spindle 422. The shaft 421 is clamped within the hole 424 using a rotatable clamping element 425, which may include a cantilevered flexure providing an interference fit to provide sufficient friction to hold the depth micrometer 420 in the respective hole 424. When the clamps 425 are rotated downward until the clamp rods are horizontal, as shown by the arrow in FIG. 8A, the micrometers 420 are locked into place. The clamp 425 can be released to allow the angular position of the depth micrometer 420 to be rotated to a desired rotational position. The depth micrometer 420 is preferably a commercially available depth micrometer with a digital display readout providing an absolute measurement of the distance of the blade gap.

In a modified embodiment, the elongate body 402 of the device 400 may comprise only one mounting 418 for a single depth micrometer 420. In a yet further modified embodiment, the body 402 is provided with greater than two mountings 418 for mounting greater than two depth micrometers 420.

Figure 11:
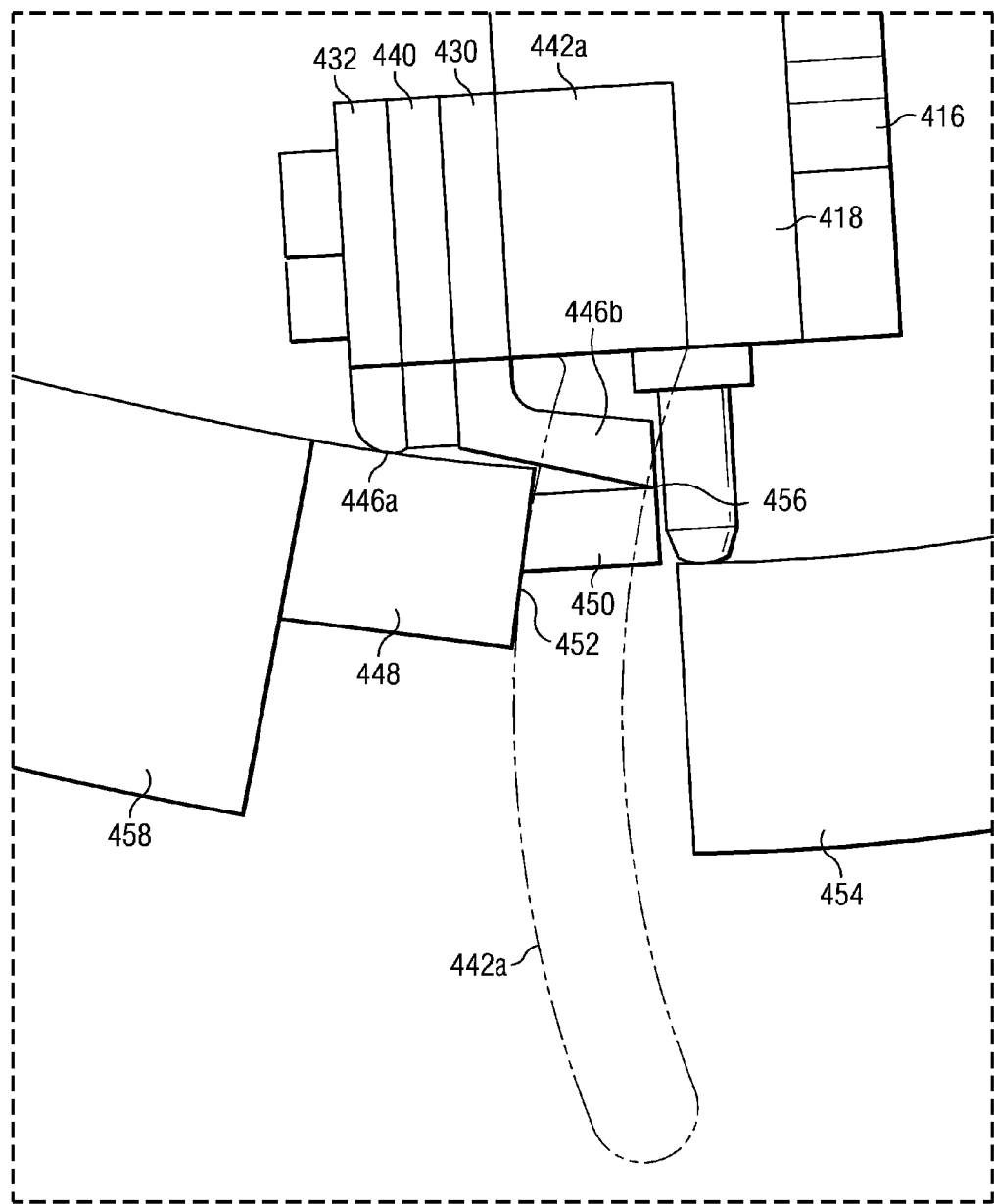
FIG. 11 provides a blown up view depicting the reference points of FIG. 10B.

Opposite the support portion 406, forwardly of the mounting 418, is attached a back magnet cover or back block 430 with locating pins 426. In one embodiment, as depicted FIGS. 8A and 8B, the back block 430 comprises an extension 446b extending along the bottom side of the back block 430. The extension protrudes rearwardly from a front block 432. In one embodiment, when viewed from the side (as best depicted in FIG. 11), the extension 446b extends below the mounting 418, with a slight gap forming in between the bottom of the mounting and the top of the extension 446b. In other embodiments, the back block may comprise any number of shapes so long as the bottom portion provides for the proper references surface, as further described below.

Figure 8B:
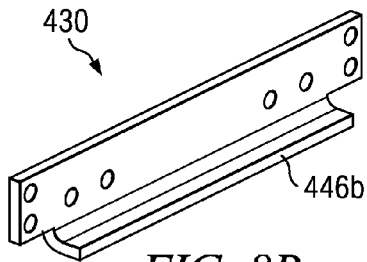
FIG. 8B is a blown-up view of one embodiment of a back block of the blade gap setting device as depicted in FIG. 8A.

FIG. 8B depicts a blown up perspective view of the back block 430 having an extension 446b along a bottom portion thereof and in between higher end portions 434. In one embodiment, the back block substantially comprises an L-shape when viewed from the side. Other optional shapes include without limitation shapes which are substantially quadrilateral, triangular, or quarter circle. In one embodiment, the bottom of the back block comprises the third lower reference surface. In another embodiment, the bottom of the block assembly, further described below, comprises the third lower reference surface.

On the side opposite the mountings 418, the back block 430 is connected to a magnet holder or spacer 440, which houses at least one magnet 438. Thus, at least one magnet 438 is provided within or connected to the body 402 of the device 400. The magnet 438 is preferably located towards or at the lower surface 444 (shown in FIG. 9) such that the lower surface 444 of the body 402 is magnetically attracted to a material such as stainless steel from which a blade cutter assembly of a potato chip cutting head is typically composed. The magnet 438 provides that the device 400 can be temporarily attached, by magnetic force, to the internal circumferential surface of such a blade cutter assembly.

As illustrated best in FIG. 8A, a plurality of linearly spaced magnets 438, extending serially along the length of the body 402, are held in the holder 440. In one embodiment, the holder 440 contains only one magnet 438. In one embodiment, the magnet is long enough to extend between the bolts 428, as depicted in FIG. 8A. In other embodiments, the holder 440 may comprise more than one magnet so long as the magnetic poles of the magnets are properly aligned. In one embodiment, the holder 440 comprises up to seven magnets. Any magnetic material strong enough to support the weight of the device may be used, whether man-made or natural. By way of example, and without limiting the scope of the invention, the magnet(s) may comprise neodymium or any other rare earth magnetic materials or a combination thereof. By providing that the blade gap setting device 400 may incorporate one or more magnets so as to be adapted to be magnetically held onto a magnetic material, in accordance with another aspect of the invention, the device may benefit from improved calibration accuracy and repeatability. It should also be noted that the device need not comprise a magnet. In other embodiments, the blade gap setting device may comprise electromagnetic properties. Alternate embodiments may also include suction cups, for example, to attach the device to a cutting head for measuring.

A first rounded front reference surface 446a is located forwardly of the at least one mounting 418. The rounded front reference surface is configured to fit against an interior side of a blade holder of a blade cutter assembly in order to fit the device in a desired position to the potato chip cutting head, as further discussed below. In one embodiment, the first rounded front reference surface 446a is comprised of a front magnet cover or front block 432. Specifically, the lower bottom portion of the front block 432 comprises a rounded surface that extends longitudinally along at least a portion of the body 402. The front block 432 is further located forwardly of the one or more magnets 438, on the side opposite the back block 430. In other words, the holder 440 is sandwiched between two covers or blocks, a front block 432 and a back block 430 using four bolts 428, which are fixed to, and located forwardly of, the mountings 418. In one embodiment, the front block 432 comprises a first rounded front reference surface 446a along its bottom, which extends between the two outer legs of the body, as best depicted in FIGS. 10 and 11, described below. The blocks 430, 432 each comprise higher end portions 434 at the bottom of either end of the blocks 430, 432, with a central lower portion 436 extending therebetween.

The back block 430 together with the front block 432 form a block assembly within the device 400. Thus, in some embodiments, the first rounded front reference surface is comprised of a front bottom portion of the block assembly, wherein the front bottom portion is configured to fit against an interior side of a blade holder. Further, the third lower reference surface is comprised of a bottom surface portion of the block assembly, wherein the bottom surface configured to rest against a top surface of a blade. The block assembly may comprise any number of shapes including without limitation square, triangular, rectangular or quarter circle. In one embodiment, the block assembly comprises an extension along a bottom length, the extension protruding rearwardly, or towards the spindle. In one embodiment, the extension provides for a substantially L-shaped block assembly when viewed from the side, as in FIG. 11.

A second front reference surface 452 extends downwardly from the body 402. The second front reference surface 452 is comprised of a front portion of a pair of curved legs 442. The legs 442a, 442b are longitudinally spaced along the elongate body 402 and on the exterior sides of the mountings 418, each being located at least partially outside the opposing ends 404 of the support portion 406.

Figure 9A:
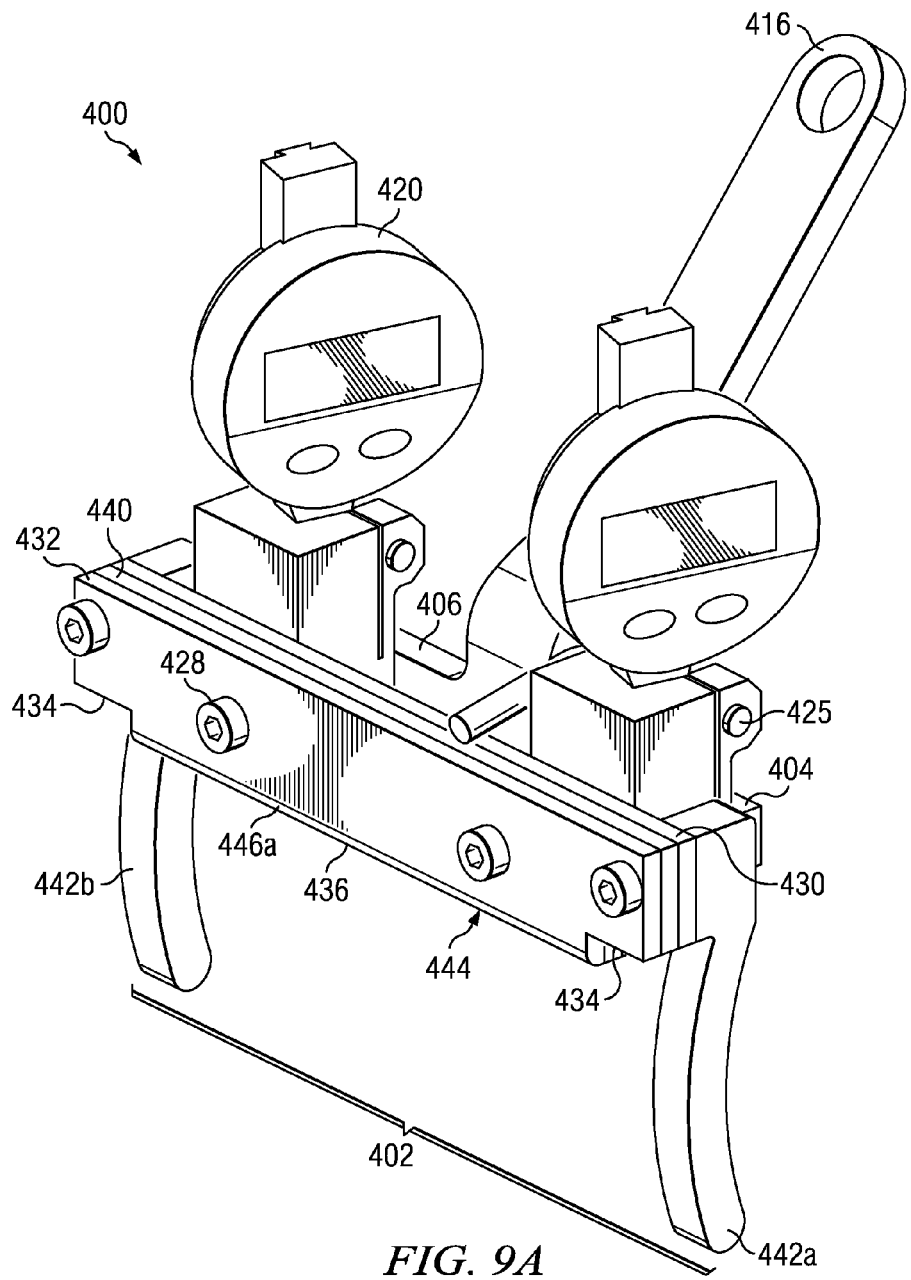
FIG. 9A is a perspective view of the assembled blade gap setting device of FIG. 8A.
Figure 9B:
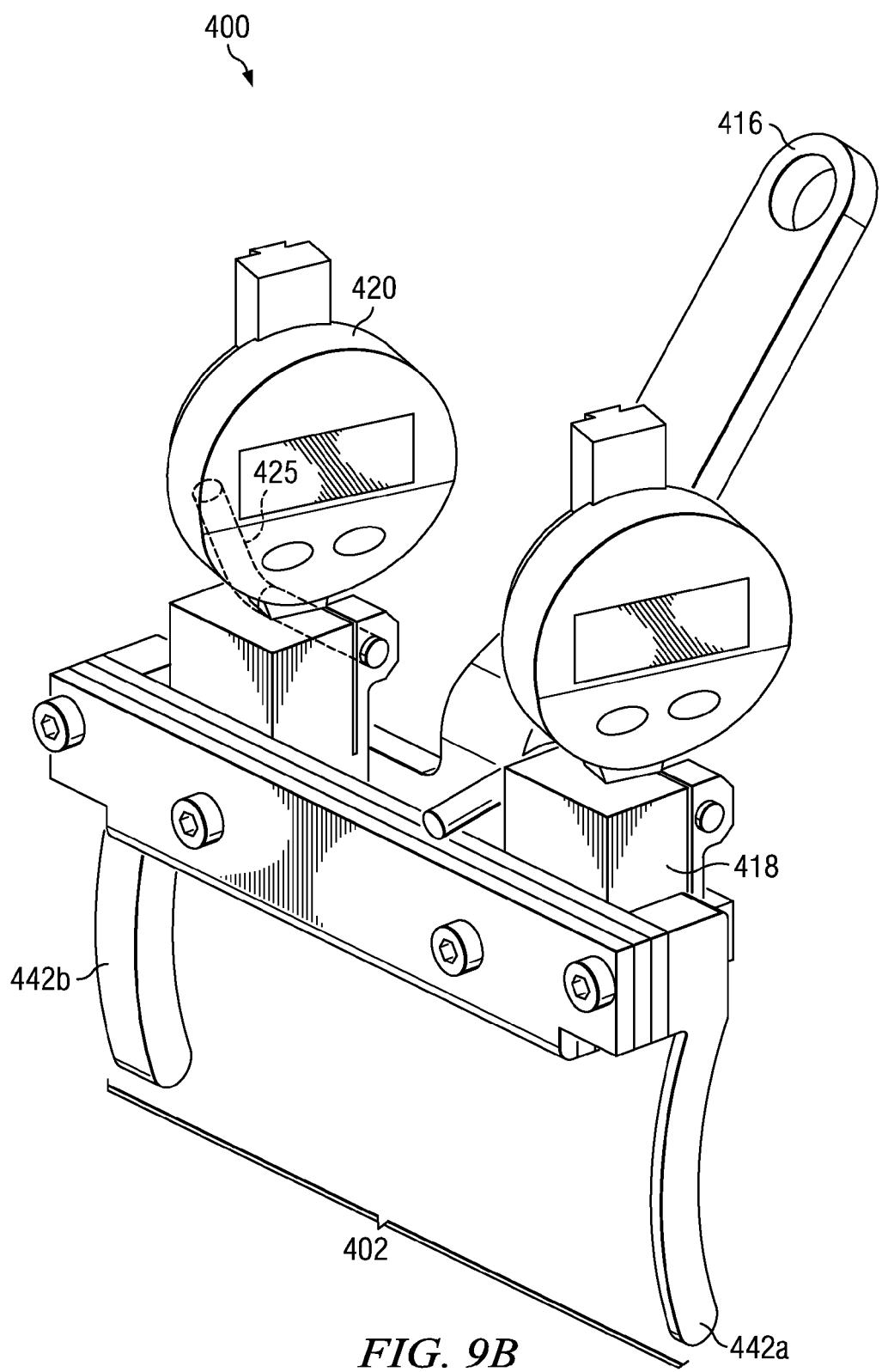
FIG. 9B is a perspective view of another embodiment of an assembled blade gap setting device.

The legs 442 may be connected by any means known in the art. As depicted in the figures, for example, the legs are attached via a bolt 428 and a locating pin 426. In one embodiment, as best depicted in FIG. 9A, the legs 442a, 442b comprise the same thickness. In another embodiment, as depicted in FIG. 9B, one leg 442a is of a different thickness than the other leg 442b. The thickness of the leg 442a is reduced in this embodiment in order to eliminate the interference between the leg 442a (which when inserted into the blade cutter assembly is the top leg) and both the blade and the top ring of a blade cutter assembly. In another embodiment, both legs 442a, 442b may comprise the same reduced thickness.

Once assembled, the gap setting device 400 may reference and attach to a blade holder of a shoe. As depicted in FIGS. 10 and 11, both the first rounded front reference surface 446a and the second front reference surface 452 bear against the blade holder 448. The first rounded front surface 446a references or bears against an interior portion of a blade holder 448. The second front reference surface 452 is inserted in the gap between the blade holder 448 and an adjacent shoe 454, on the side exterior sides of the elongate blade 450. The front reference surface 452, comprising a portion of the front side of the legs 442, references or bears against the side of the blade holder across from the adjacent shoe 452. In order to easily and consistently reference or touch the blade holder, the legs are slightly curved such that a front portion of the legs comes into contact with the forward side of the blade holder. Such contact also helps to pull the device 400 into the appropriate position as it is rotated to sit within the interior of the blade cutter assembly.

As best depicted in FIGS. 8B and 11, the device 400 further comprises a third lower reference surface 456 below the mounting 418. The third lower reference surface 456 is comprised of a bottom surface portion of a block assembly. In one embodiment, an extension 446b protruding towards the spindle on the back side of the block assembly, or a back block thereof, comprises the bottom surface portion 456 that rests upon a top surface of the blade. In one embodiment, the extension may be viewed as L-shaped when viewed from the side. However, other embodiments are also plausible including without limitation quarter circle, rectangular, square, etc., so long as a bottom surface portion is configured to gently rest upon a top surface of a blade to help hold the device in place during measurements. In one embodiment, a bottom surface portion 456 of the extension 446b references or gently bears against a top surface of a blade 450. In other words, a bottom surface 456 of the extension 446b may gently touch the top surface of the blade 450 along a line without damaging the blade edge.

FIGS. 10A-D depict the process of inserting (shown in FIGS. 10A and 10B) and removing (shown in FIGS. 10C and 10D) the blade gap setting device 400 such that the device is temporarily attached by the magnetic force of a magnet 438 to the internal circumferential surface of a blade cutter assembly. It should be noted that the blade cutter assembly of a potato chip cutting head is depicted in FIG. 10 without the top and bottom rings in order to best depict the insertion and removal of the device 400. The blade cutter assembly includes a first wall element 458 and a second wall element 454. The wall elements 458, 454 are also referred to in the industry as shoes and typically comprise an arcuate shape. The first wall element 458 carries a blade holder 448 that removably and adjustably mounts a blade element 450 having an exposed cutting edge. Spaced circumferentially from the cutting edge is a second wall element 454, a blade gap being defined between the cutting edge and an adjacent surface of the second wall element 454.

Figure 10A:
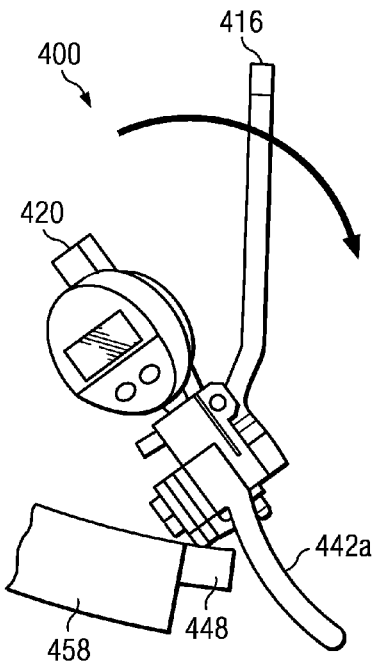
FIGS. 10A and 10B are side views that illustrate sequential steps during insertion of the blade gap setting device of FIG. 9 into a cutting head.
Figure 10B:
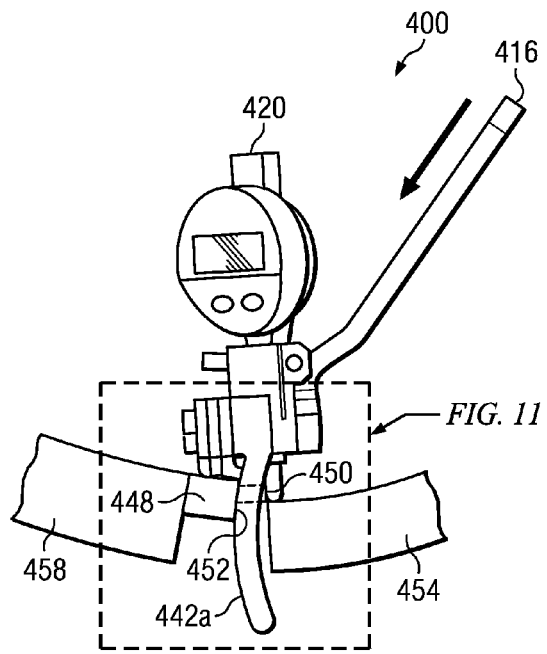

The blade gap setting device 400 is held manually by its handle 416 and moved within the central cavity of the blade cutter assembly towards the internal circumferential surface of the wall elements. The legs 442a, 442b, are longitudinally spaced along the elongate body 402 by a distance which is greater than the length of the blade element 450 such that the legs 442 do not contact the blade element but slide into a spacing between the top or bottom rings (not shown) and the blade element. Preferably, the device should be tilted forward, as depicted in FIG. 10A. The lower leg 442b should be placed against the top of the bottom support ring as a guide to properly align the device 400 with the blade element 450 and the blade holder 448. Once tilted as in FIG. 10A, the device can be slid into position along the front surface of the legs against the blade holder. After insertion, the device 400 can be rotated downwardly or backwards (toward the handle 416) as shown by the arrow in FIG. 10A, with an internal surface of the blade holder acting as a fulcrum against which the front surface of the body 402 is rotated. The front curved surfaces of the legs are thus pushed against the blade holder. As shown in FIG. 10B, the device can then be gently pushed into the blade holder to allow the reference surfaces to make the appropriate contacts. In embodiments comprising magnets, the magnets will help hold the device in place by applying consistent pressure against its reference surfaces.

As discussed above with reference to FIG. 11, when inserted into a blade cutter assembly, the device 400 makes contact with the blade cutter assembly along three reference (i.e., contact) points: a first rounded front reference surface 446a located forwardly of the mounting 418, a second front reference surface 452 extending downwardly from the body, and a third lower reference surface 456 below the mounting or spindle. The first rounded front reference surface contacts an interior side of a blade holder. The second front reference surface contacts a side of a blade holder across from an adjacent wall element or shoe. The third front reference surface contacts a top surface of the blade. Once inserted into the measurement position, the free end(s) 460 of the spindle(s) descend down onto the adjacent shoe. Thus, the free end 460 is compressed in order to be zeroed on the calibration block and the readings of the depth micrometer are with the free end 460 extended.

Figure 10C:
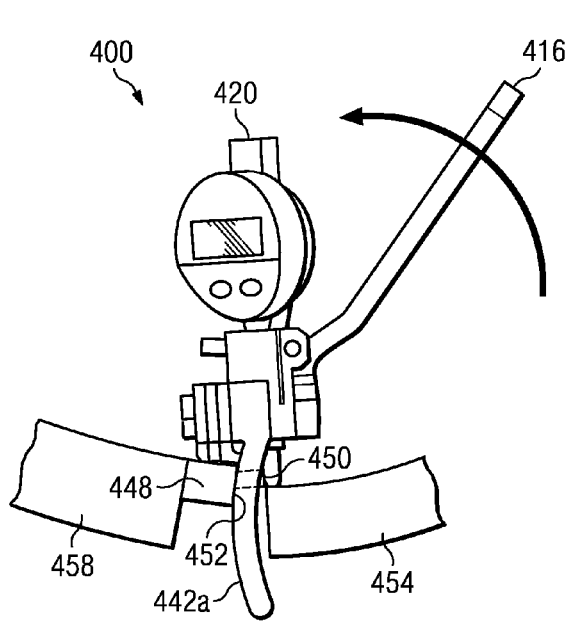
FIGS. 10C and 10D are side views that illustrate sequential steps during removal of the blade gap setting device of FIG. 9 from a cutting head.
Figure 10D:
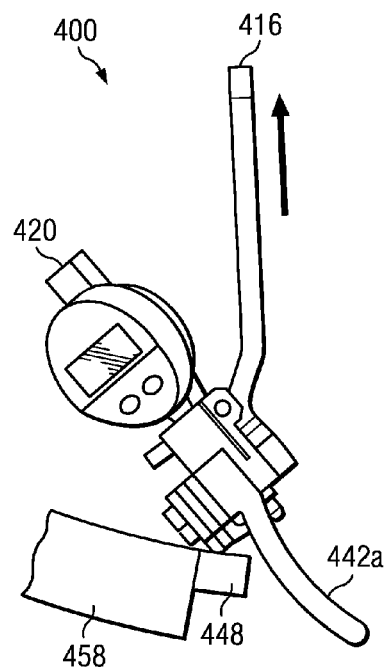

When removing the blade gap setting device 400, the device is manually rotated about the front edge of the block assembly or front block 432 in a direction opposite its insertion, as depicted in FIG. 10C. In other words, when grabbing by the handle 416, the device 400 is titled forward as far as possible using the blade holder as fulcrum on which the first reference surface is rotated. Once the device 400 is back in its tilted forward position, it can then be pulled towards the center of the blade cutter assembly for safe removal. The lower leg 442b (not depicted in FIG. 10) may again act as a guide for the sliding of the device against the blade holder.

Figure 12A:
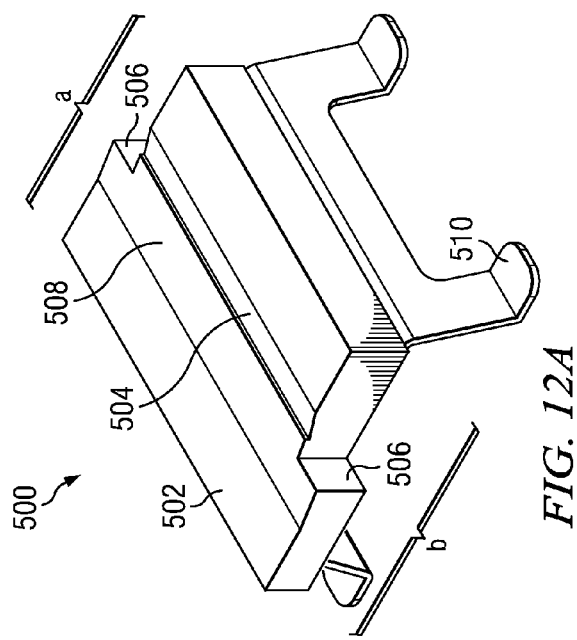
FIGS. 12A and 12B are perspective views of a calibration block for use with the blade gap setting device of FIG. 9.
Figure 12B:
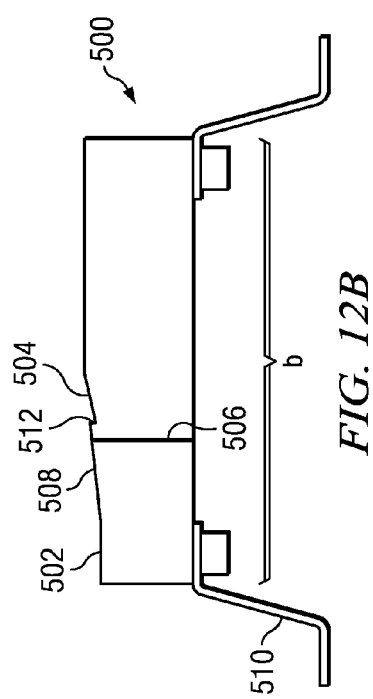

Referring to FIGS. 12A and 12B, the depth micrometer(s) 420, when inserted through the channel(s) 424 of the mountings 418, can readily be calibrated using a calibration block 500. Similar to the embodiment depicted in FIG. 7, the calibration block 500 may also act as a holder for the device 400 as depicted in FIG. 12A. To enable calibration to be in a hands-free manner, the calibration block 500 may be made of a magnetic material such as, for example, a hard stainless steel magnetic material including without limitation stainless steel 440C. This improves the dimensional stability and wear resistance of the calibration block 500.

As best depicted in FIG. 12B, the calibration block 500 has a generally planar upper surface 502 and a slightly inclined portion 508 sloping up from the planar upper surface 502 to a higher portion 512. In addition, the calibration block comprises a channel 504, the depth or profile of which can be varied according to the desired thickness of a sliced food product. In the illustrative embodiment of FIG. 12, there is only one calibration channel 504. During the calibration process, the calibration block 500 is preferably set or rested upon a flat surface such as a table. For convenience, the block 500 may comprise legs 510.

On one end of the calibration block 500, at opposing sides a and b of the block 500, are two tabs 506. Similar to the blade holder of a blade cutter assembly, the tabs 506 provide a point of contact or reference surface for the legs 442, 442b of the device 400. To place the gap setting device 400 onto the calibration block 500, the blade gap setting device 400 is tilted forward, with the legs 442 of the device 400 straddling the calibration block 500 below the tabs 506 at sides a and b. The device 400 is then slid against the tabs 506 along the front, curved surface of the legs 442 until the reference surface 446a of the body 402 comes into contact with the block

Figure 13:
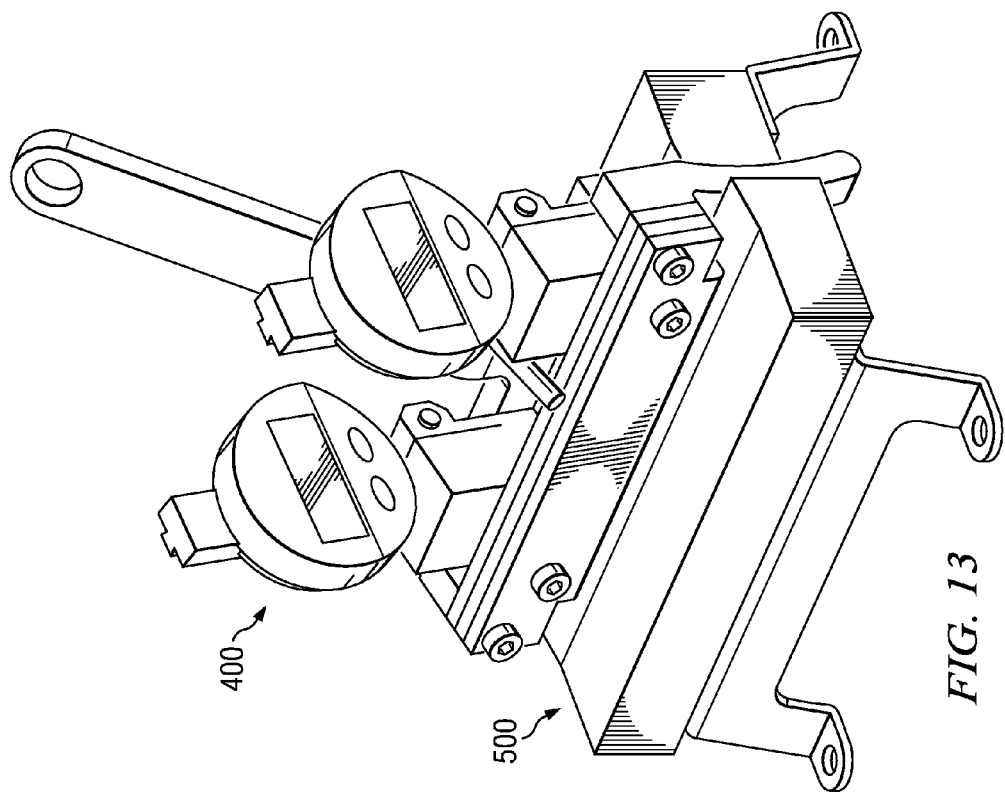
FIG. 13 is a perspective view of the blade gap setting device of FIG. 9 placed onto the calibration block of FIGS. 11A and 11B.

500. Having made contact with the reference surface 446a, the device 400 should be rotated backwards slightly such that the legs 442a, 442b are flush against the tabs 506. The magnets 438 of the device 400 should then help align the reference surfaces 446a, 452 as the device 400 is rotated backwards to hold the device 400 in place. FIG. 13 depicts a blade gap setting device 400 placed onto the calibration block 500. Although not depicted in detail, the spindle 422 of the depth micrometer 420 is in contact with the calibration block 500 in the channel 504 and the micrometer may then be adjusted or calibrated for use. When subsequently used to measure blade gap, the absolute measurement of the blade gap is indicated on the display of the depth micrometer 420.

Figure 1:
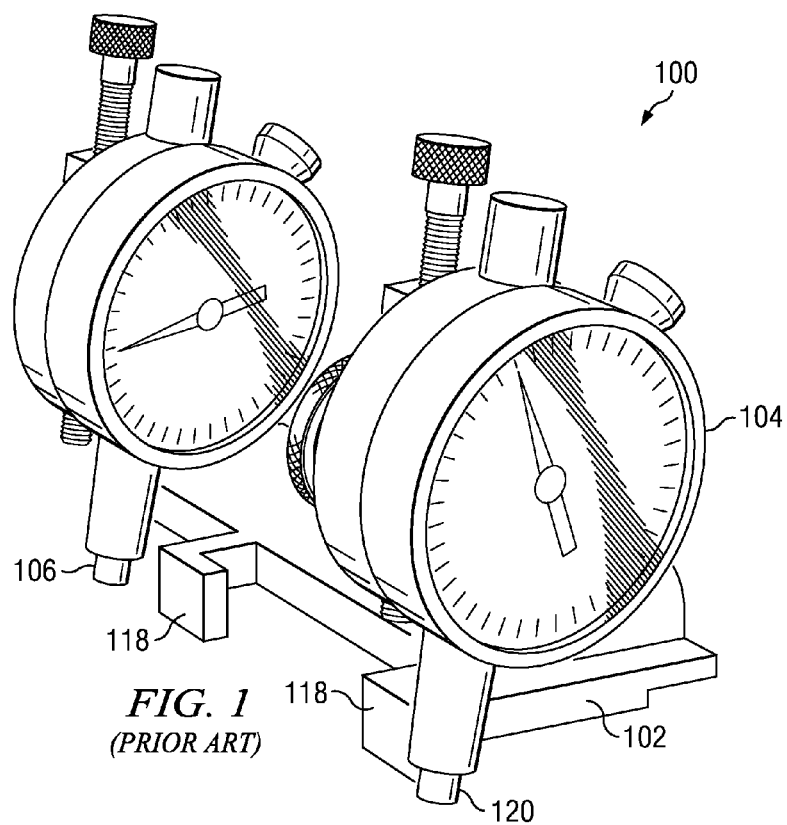
FIG. 1 is a perspective view of a known blade gap setting device.
Figure 2:
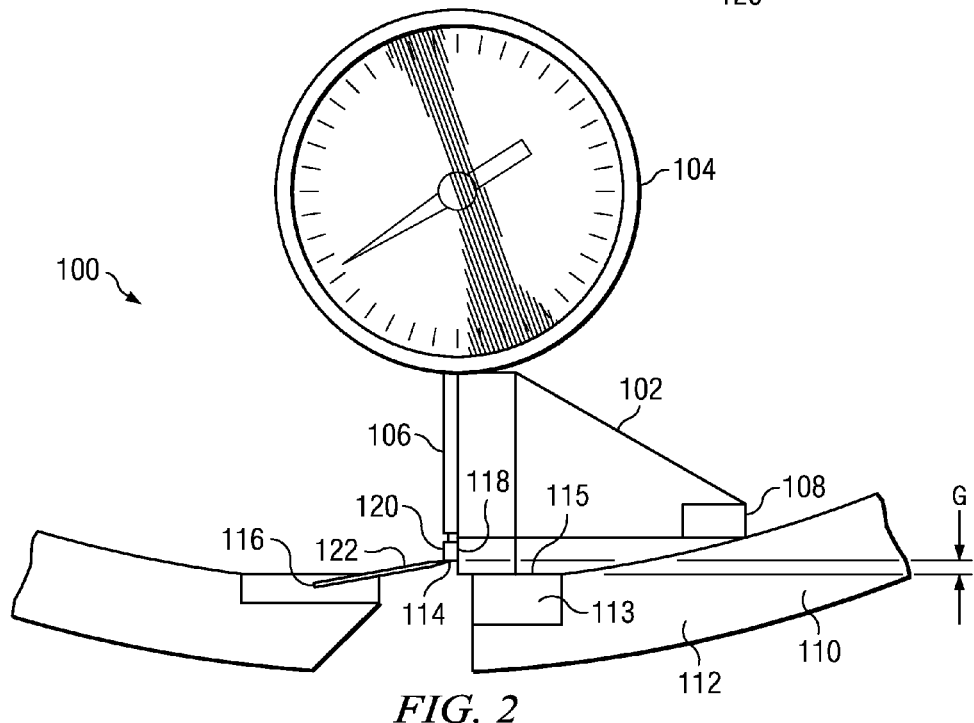
FIG. 2 is a side view showing the known blade gap setting device of FIG. 1 when used to measure a blade gap of a potato chip cutter head.

As with the embodiment of FIGS. 3 to 5, the blade gap setting device 400 provides a number of advantages over the known blade gap setting device discussed in FIGS. 1 and 2.

First, the inclined handle improves the ergonomics of the device and provides easy maneuvering of the device into and out of the measurement position. The handle provides leverage to disengage the magnetic force holding the device onto the cutting head, with the front end of the body being rotatable against a fulcrum of the cutter head during the insertion and removal operation. The handle is oriented upwardly away from the body and points towards the rearward side of the device, which tends to move the hand of the operator upwardly away from any adjacent cutting blades of the series of cutting blades which are located annually around the potato chip cutting head. Second, the depth micrometers can readily be located into the correct angular position for accurate and consistent measurements (having a tolerance of +/−40 microns) and easy reading of the measurements. The clamp(s) allow for quick adjustment or removal of the depth micrometer(s). Third, the free standing calibration block makes the calibration process simple. Fourth, the blade gap setting device 400 is very easy to install accurately in position on the potato chip cutting head. Fifth, the magnet holds the device in the desired position on the potato chip cutting head, allowing the operator to use both hands to adjust the blade gap while the measuring device is still located securely in position in the potato chip cutting head. Therefore the blade gap setting device is configured as a "hands-free" device. The magnet design allows for the use, to form the body, of hard stainless steel materials, for example stainless steel 440C, which improves the dimensional stability and wear resistance of the device.

Moreover, the blade gap setting device 400 gently contacts the top surface of the blade and so it does not dull the blade during use, in contrast to the setting devices currently known in the industry. Because the device attaches to a blade holder and is not dependent upon a sand gate, the references surfaces may be utilized with a variety of cutting head shapes and dimensions and can be used with any number of blades including without limitation, linear planar blades, non-planar profiled blades, and other blades with any number of curves, waves or corrugations. The curved legs provide a surface on either side of the body 402 of the device, which allows for the device to be quickly and easily located into the correct position and orientation without damaging the depth micrometers, blade, blade cutter assembly or the device itself.

Other modifications to the blade gap setting device described above will be readily apparent to those skilled in the art.

What is claimed is:

1. A blade gap setting device for a potato chip cutting head, the device comprising an elongate body having an upper surface and a lower surface, at least one mounting for a depth micrometer having a displaceable spindle, the mounting comprising a channel extending downwardly therethrough wherein the depth micrometer is inserted into the channel with a free end of the displaceable spindle being exposed at the lower surface, a first rounded front reference surface located forwardly of the mounting, a second front reference surface extending downwardly from the body, and a third lower reference surface below the mounting, wherein the second front reference surface extending downwardly from the body is comprised of a front portion of a curved leg of the blade gap setting device.

2. A blade gap setting device according to claim 1 wherein the first rounded front reference surface extends longitudinally along at least a portion of the body.

3. A blade gap setting device according to claim 2 wherein the first rounded front reference surface extends between two outer legs of the body.

4. A blade gap setting device according to claim 1 comprising two mountings, the two mountings being longitudinally spaced along the length of the elongate body, each mounting adapted to mount a respective depth micrometer.

5. A blade gap setting device according to claim 1 further comprising at least one magnet within the body.

6. A blade gap setting device according to claim 5 wherein the at least one magnet is located towards the lower face.

7. A blade gap setting device according to claim 5 wherein the at least one magnet is sandwiched between a front block and a back block.

8. A blade gap setting device according to claim 7 wherein the at least one magnet is supported in a holder.

9. A blade gap setting device according to claim 5 in combination with a calibration block for the device, the calibration block comprising an upper surface of magnetic material adapted to hold the device thereon by a magnetic force from the at least one magnet, the upper surface having at least one tab adapted to receive the second reference surface.

10. A blade gap setting device according to claim 1 wherein the first rounded front reference surface is comprised of a front bottom portion of a block assembly, said front bottom portion configured to fit against an interior side of a blade holder.

11. A blade gap setting device according to claim 10 wherein said block assembly comprises a front block, wherein said front bottom portion extends along a bottom length of said front block.

12. A blade gap setting device according to claim 1 wherein the second front reference surface is comprised of a front portion of a pair of curved legs.

13. A blade gap setting device according to claim 12 wherein the two legs have different thicknesses.

14. A blade gap setting device according to claim 12 wherein each of the legs is located on the exterior sides of the at least one mounting.

15. A blade gap setting device according to claim 1 further comprising a handle extending upwardly and rearwardly from the body.

16. A blade gap setting device according to claim 15 wherein the handle is centrally located along the longitudinal direction of the elongate body.

17. A blade gap setting device according to claim 1 further comprising at least one depth micrometer having a displaceable spindle, each depth micrometer being fitted into a respective mounting.

18. A blade gap setting device according to claim 17 wherein the depth micrometer is removably fitted into the respective mounting, and the device further comprises a clamping unit removably clamping each depth micrometer in the mounting, the clamping unit being adapted to permit selective rotation of the depth micrometer in the mounting.

19. A blade gap setting device according to claim 1 wherein the third lower reference surface is comprised of a bottom surface portion of a block assembly, said bottom surface configured to rest against a top surface of a blade.

20. A blade gap setting device according to claim 19 comprising an extension along a bottom length of said block assembly, said extension comprising said bottom surface portion.

21. A blade gap setting device according to claim 20 wherein said block assembly comprises a back block having said extension.

22. A method of measuring a blade gap setting of a potato chip cutting head, the method comprising the steps of:
- providing a blade cutter assembly of a potato chip cutting head including a first shoe comprising a blade holder which removably and adjustably mounts a blade element having an exposed cutting edge and a second adjacent shoe spaced from the exposed cutting edge, a blade gap being defined between the cutting edge and the adjacent shoe;
- providing a blade gap setting device including a body mounting at least one depth micrometer thereon, the depth micrometer including a movable spindle, the body having a first rounded front reference surface, a second front reference surface, and a third lower reference surface, wherein the second front reference surface is comprised of a curved leg extending downwardly from the body;
- fitting the blade gap setting device to the blade cutter assembly by respectively locating the first and second front reference surfaces to inner and side surfaces of the blade holder and locating the third lower reference surface to a top surface of said exposed cutting edge; and
- moving a free end of the spindle into contact with the second wall element to provide a distance measurement on the respective depth micrometer.

23. A method according to claim 22 wherein the body includes a magnet and the blade gap setting device is magnetically secured to the blade cutter assembly in the fitting step.

24. A method according to claim 22 wherein the blade gap setting device further comprises a pair of curved legs extending downwardly from the body, and wherein said fitting step comprises sliding the legs through a spacing between the first and second wall elements.

25. A method according to claim 22 wherein the fitting step comprises rotating the blade gap setting device into position by rotating a surface of the body against an internal surface of the blade holder acting as a fulcrum.

26. A method of calibrating a blade gap setting device of a potato chip cutting head, the method comprising the steps of:
- providing a blade gap setting device including a body mounting at least one depth micrometer thereon, the depth micrometer including a movable spindle, the body having a rounded first front reference surface, a second front reference surface, and a third lower reference surface, the device further optionally including at least one magnet;
- providing a calibration block comprising an upper surface of magnetic material adapted to hold the device thereon by a magnetic force from the at least one magnet, the calibration block having at least one tab and a slightly inclined zone in the upper surface;
- fitting the blade gap setting device to the upper surface of the calibration block by respectively locating the first and second front reference surfaces to the inclined zone and the tab and by locating the third lower reference surface to the top portion of said inclined zone, wherein in the device is held in the fitted position by the magnetic force from the magnet; and
- moving a free end of the spindle into contact with a channel in the upper surface of the calibration to provide a distance measurement on the depth micrometer.

* * * * *